(12) United States Patent
Wittschen

(10) Patent No.: US 6,641,906 B2
(45) Date of Patent: Nov. 4, 2003

(54) HIGH TEMPERATURE CLIP CUSHION

(76) Inventor: Robert Francis Wittschen, 4447 Great Oak Dr., Charleston, SC (US) 29418

( * ) Notice: Subject to any disclaimer, the term of this patent is extended or adjusted under 35 U.S.C. 154(b) by 92 days.

(21) Appl. No.: 09/969,067

(22) Filed: Oct. 2, 2001

(65) Prior Publication Data

US 2003/0066161 A1 Apr. 10, 2003

(51) Int. Cl.⁷ .................................................. C08J 5/16
(52) U.S. Cl. ............................... 428/312.6; 428/313.9; 428/402; 523/149
(58) Field of Search .................. 264/109–128; 428/312.6, 2.1, 313.9, 402; 523/149

(56) References Cited

U.S. PATENT DOCUMENTS

| | | | | |
|---|---|---|---|---|
| 4,370,436 A | * | 1/1983 | Nakamura et al. | 524/322 |
| 5,089,200 A | * | 2/1992 | Chapman et al. | 264/127 |
| 5,312,576 A | * | 5/1994 | Swei et al. | 264/112 |
| 6,045,136 A | * | 4/2000 | White | 277/528 |
| 6,218,015 B1 | * | 4/2001 | Allen et al. | 428/422 |

OTHER PUBLICATIONS

General Electric Aircraft, A50TF232, specification, Cincinnati, OH, USA.
Boeing Aircraft, BPS–C–155, specification, Seattle, WA, USA.
Pratt and Whitney, CPW–437, specification, Canada.
Allison Engine, EMS–24215, specification, USA.
Society of Automotive Engineers, AMS3677, specification, Washington, DC, USA.
Pratt and Whitney, PWA–484, specification, Hartford, CN, USA.

* cited by examiner

Primary Examiner—Stephen J. Lechert, Jr.

(57) ABSTRACT

A process and composition of matter for preparing an improved clip cushion product having tighter dimensional control, better consistency of composition, higher heat resistance, better crack resistance, less abrasive, and lower weight loss at high temperature.

2 Claims, 1 Drawing Sheet

HIGH TEMPERATURE CLIP CUSHION

CROSS-REFERENCE TO RELATED APPLICATIONS

Not Applicable.

FEDERALLY SPONSORED RESEARCH

Not Applicable.

MICRO FISCHE APPENDIX

Not Applicable.

BACKGROUND OF THE INVENTION

This clip cushion relates to fasteners, and specifically to the aerospace industry where high temperatures are experienced.

The areas around rocket motors and jet engines experience temperature extremes in the 450° F. to 600° F. range, and above. Assemblies in these areas need to have other parts attached to them. A prime example would be a hydraulic or fuel line attached to or near an engine. Hence, a hollow metal tube needs to be attached to the engine or another object. If a metal strap were used to fasten the metal tube, problems would occur. Fastening one metal part to another causes problems if vibration and movement between parts occur. Also, the metal parts may abrade each other and cause a hole in the tube.

The solution of the 1950's was to use a non-metallic cushion between the strap and the tube. These parts are usually referred to as clamp cushions or clip cushions.

Aerospace companies approved and wrote specifications around an asbestos textile based product, which was coated with polytetrafluoroethylene dispersion and then dried, formed, sintered, and machined. The entire process took about ten separate steps.

Asbestos in grades AA and AAA and Teflon were serviceable at 600° F. The Teflon coating allowed for the tube to slide within the strap during movement. Vibration and abrasion were reduced by the non-metallic cushion effect. However, when the Teflon (i.e. polytetrafluoroethylene) coating wore down, the asbestos fibers caused abrasion due to their high modulus.

However, the use of asbestos came under attack by various government agencies and the public in general.

For whatever reason, the aerospace community eliminated asbestos beginning with product approvals in 1986.

The second solution to this fastening problem was to use a non-asbestos based textile product coated with Teflon as the replacement. The non-asbestos textile was based on Nomex, Kevlar, fiberglass, and polybenzimidazole (i.e. PBI). The process was very similar and also took about ten steps.

However, the replacement product has problem areas. First, Kevlar, Nomex, and PBI are not rated to 600° F. They are rated at 355° F., 500° F., and 500° F. respectively as reported in "Material Engineering—Materials Selector 1989."

Second, Kevlar is high modulus and is abrasive.

Third, when a textile-based product is machined, the yarn ends are cut. When this is subsequently bent, the yarn ends have a desire to separate due to stress. This causes a crack between yarn ends which questions product reliability as to whether the crack will propagate over time or not.

Fourth, a ten-step process involving water based dispersions and textile methods can be difficult to control from a composition consistency and dimensional control viewpoints.

Current specifications on the non-asbestos based textile product include:

| | |
|---|---|
| A50TF232 | General Electric Aircraft |
| BPS-C-155 | Boeing Aircraft |
| PWA 484 | Pratt and Whitney |
| CPW 437 | Pratt and Whitney |
| EMS-24215 | Allison |
| AMS 3677 | Aerospace Material Specification |

SUMMARY OF THE INVENTION

The invention is an improved product for high temperature clip cushions using an improved composition of matter and an improved process.

The improved process reduces the process steps from about ten to two: mix the powders and ram extrude to size in a Teflon processing extruder. Process inconsistencies are reduced and dimensional values are more tightly controlled through the die forming process.

The improved composition of matter is based on:

Teflon powder (PTFE or chemically modified PTFE*)

Glass bubbles and/or beads (micro version)

High temperature pigments (if needed for coding)

*NXT70 by Dupont and TFM by Dyneon for example.

All of these materials are rated for a minimal weight loss and tensile reduction up to 650° F. The Teflon may experience some softening around 635° F. Excursions to 700° F. are believed possible with minimal problems. Trials on a 70% Teflon and 30% glass bubbles or beads showed a weight loss after 24 hours at 600° F. of 0.1% and 0.04% respectively. This compares to a typical 1.00% loss on the standard textile based product.

Abrasion should be improved by the elimination of Kevlar but no tests have been done.

The "cracking" phenomenon between yarn ends of a textile product is eliminated by the use of a homogeneous blend of powders. Bend tests on the materials subjected to 600° F. for 24 hours showed full flexibility and no cracking after being bent on themselves (i.e. 180° or folded on themselves). The normal test is to bend around a ¼" diameter rod and check for cracks.

DESCRIPTION OF THE INVENTION

Figure 1:
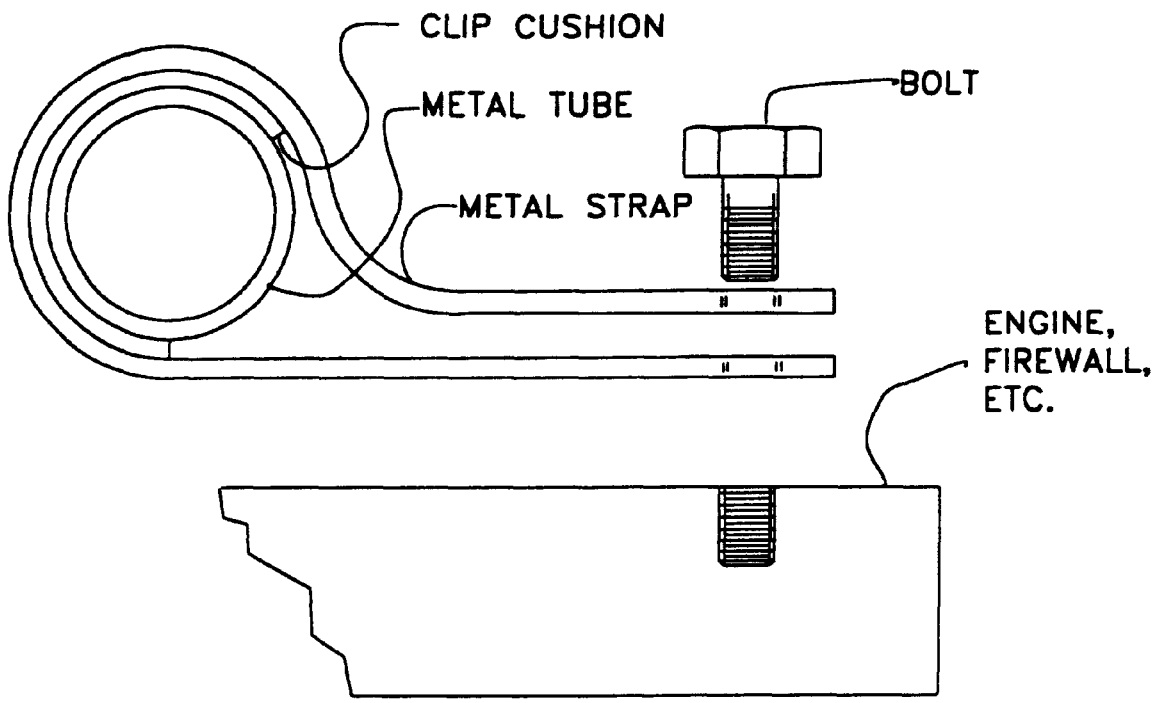
FIG. 1 is a side view of a tube fastened to a support with a clip cushion in place.
Figure 2:
FIG. 2 is a cross sectional view showing a typical clip cushion configuration.
Figure 3:
FIG. 3 is a cross sectional view showing another typical clip cushion configuration.

The composition of matter has already been discussed. It is new and novel in that it uses powder extrusion instead of a textile based product; it uses a new composition of matter, and it is a new use for powder technology.

It is non-obvious in that textile based material has been used for 50 years, and omission of some previously used materials provide product improvements.

The process of ram extrusion or compression molding of Teflon powders is well known. The basic process is to blend powders and then ram extrude or compression mold them. Any person skilled in the art of Teflon molding or ram extrusion could make the final product. The invention is not the process but using the process in a field in which it has not been used before.

I claim:

1. A clip cushion material comprising a mixture of 70% polytetrafluoroethylene by weight in combination with 30% glass microbubbles whereby a material will be provided having a weight loss of 0.1% after 24 hours at 600° F.

2. A clip cushion material comprising a mixture of 70% polytetrafluoroethylene by weight in combination with 30% glass microbeads whereby a material will be provided having a weight loss of 0.04% after 24 hours at 600° F.

* * * * *